United States Patent Office 3,214,320
Patented Oct. 26, 1965

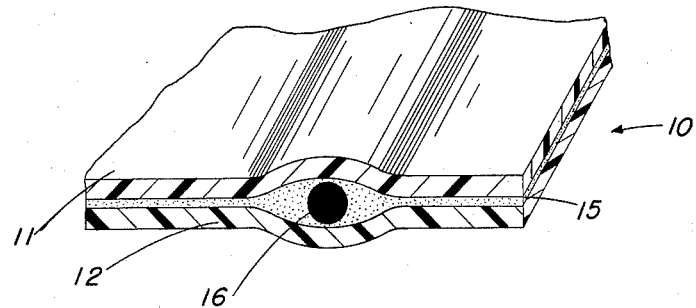
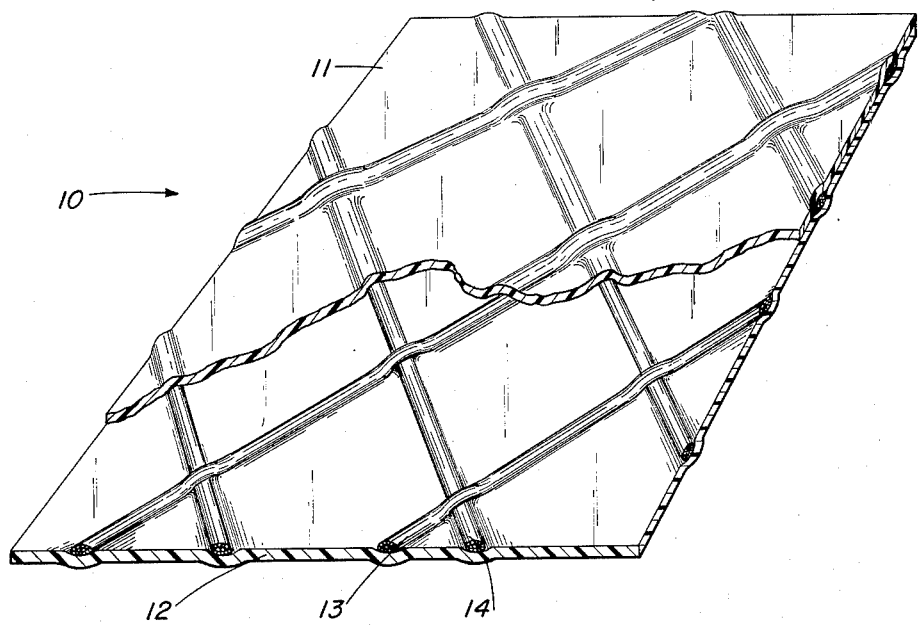

3,214,320
NON-TACKY TEAR RESISTANT MATERIAL
Risto P. Lappala and Johan A. Bjorksten, both of Houston, Tex., assignors, by mesne assignments, to Presciencia Ltd., a corporation of The British West Indies
Continuation of application Ser. No. 759,455, Sept. 8, 1958. This application Sept. 11, 1961, Ser. No. 144,523
13 Claims. (Cl. 161—89)

This invention relates to a material comprising two flexible films of material laminated together with a grid of reinforcing strands fixedly disposed within the article.

This is a continuation application of Serial Number 759,455, filed September 8, 1958, now abandoned, entitled Non-Tacky Tear Resistant Material, applicants, Risto P. Lappala and Johan Bjorksten, which relates to subject matter disclosed in a co-pending application of Risto P. Lappala Serial Number 637,982, filed February 4, 1957, now United States Letters Patent Number 2,851,389.

Many synthetic resin film compositions posses physical properties which render them valuable as replacement materials for fabrics in certain specialized uses. Among the desirable properties possessed by synthetic resin films are durability, flexibility, corrosion resistance, and low weight-density. Synthetic resin films are characterized generally by the property that once punctured, incised or otherwise ruptured, they may be torn from the point of rupture with relative ease.

The present invention provides a useful product of manufacture comprising a reinforced laminated synthetic film article which improves upon the properties possessed by synthetic film materials by rendering them tear resistant.

The preferred embodiment of the invention comprises an article wherein a grid of non-woven fibrous reinforcing strands are interposed between two dissimilar film webs of synthetic resins which are firmly adhered together. The laminated article possesses the property of tear resistance as well as exhibiting the several desirable properties possessed by synthetic resin film materials generally.

One embodiment of the invention provides a strong coherent bond between the film materials by sealing them together by the use of heat and pressure directly applied to the film having the lower melting temperature. This method is limited in use to those films which will soften sufficiently to bond to another material before a temperature is reached which partially destroys the film material or adversely affects it in some manner. Among the materials that bond very well in this manner are the polyethylene films.

A variation in the foregoing method is successful in bonding some materials that soften so slowly that they are ruined before they soften sufficiently to seal. It was found that polyvinyl chloride material failed to bond when heated by a direct external source, but bonded satisfactorily to various materials when heated electronically by a di-electric heating device.

A different embodiment of the invention provides a firmly adherent bond between the two film materials by the use of an adhesive cement. A firm setting, non-tacky adhesive provides a bond that acts substantially in the same manner as the heat sealed bond. The strands forming the reinforcing grid in the material are fixedly held in place and are prevented from moving in a lateral direction through the adhesive layer even when the material is punctured or torn. The strands must either break or tear through one of the enclosing films at the point of rupture. As a matter of practice the material is constructed so that the strands will tear away from the laminated article when they are sufficiently stressed.

It has heretofore been known to laminate together two facing sheets with an intermediate reinforcing grid by the use of a non-drying, tacky adhesive cement to provide a tear resistant material. However, a material of this construction resists tearing in a manner entirely different from the material of this invention. Wherein previously known materials enable the reinforcing strands to slidably move within the laminated structure when the material is stressed to failure, the present invention provides an adhesive which firmly anchors the reinforcing strands to prevent them from sliding laterally within the laminated structure even after failure of the material occurs and forces them to either rupture or tear apart from the material.

It is an object of this invention to provide a tear resistant reinforced resinous laminated material.

It is a further object to provide a sheet material comprised of a reinforcing grid between two film webs of synthetic resin material laminated together by heat and pressure.

It is a still further object to provide a laminated film material with a grid of fibrous material fixedly held therein, sealed together with firm setting non-tacky adhesive.

Other objects will become apparent from the drawings and from the following detailed description in which it is intended to illustrate the applicability of the invention without thereby limiting it to a scope less than that of all equivalents which will be apparent to one skilled in the art.

Referring now to the drawings wherein like reference numerals refer to like parts.

FIGURE 1 is a perspective view in cut-away of one embodiment of the invention;

FIGURE 2 is a perspective view corresponding to a portion of FIGURE 1 showing another embodiment of the invention.

In FIGURE 1 a portion of the invented laminate structure referred to generally as 10 as shown comprises facing sheet 11 sealed by being softened and pressed onto facing sheet 12 so as to be affixed to and contiguous with facing sheet 12. Interposed between facing sheets 11 and 12 are yarn strands 13 and 14 comprised of individual fibers as shown. Strand 13 overlays strand 14 and is not otherwise fastened thereto. The grid network formed by a plurality of strands 13 and 14 is comprised of interstices of parallelogram shapes. Strands 13 and 14 are sealed within facing sheets 11 and 12 but are not softened so as to be contiguous therewith.

In FIGURE 2 is shown a portion of the laminated material 10 of FIGURE 1 wherein the facing sheets 11 and 12 are adhesively cemented together by adhesive 15. A heat seal is not present in this embodiment. Adhesive 15 is a relatively hard setting adhesive. However, adhesive 15 does form an elastomeric layer between facing sheets 11 and 12. Filament 16 as shown is a monofilament reinforcing member enclosed and fixedly held between facing sheets 11 and 12 by adhesive 15.

In the preferred embodiment of the invention two webs of synthetic resin materials possessing dissimiliar temperature ranges of softening and possessing dissimilar strength and flexibility characteristics are laminated together with strands of fibrous synthetic resin placed between them in a grid configuration. The fibrous reinforcing strands are superimposed upon each other at the junctures where they are crossed in the laminated structure and are not woven.

A reinforced resinous laminated sheet is produced which is both relatively tough and flexible and which provides resistance to tears in the material substantially proportional to the length to which such tears are propagated through the material. This unique tear resistant characteristic of the material is achieved by the non-woven grid of fibers in the material being displaced as a tear propagates through the sheet. When a rupture occurs in the laminated sheet and progresses across successive fibers in the path of the rupture each such particular fiber in the ruptured area is stressed until the strength of the weaker web of facing material enclosing and restraining the fibers fails and shears along the length of each of the stressed fibers beginning first at the point of the principal rupture and progressing outward. The shearing action of the facing material along each stressed fiber enables each fiber successively to be displaced in relation to the sheet into a position describing a straight line between the two points where the facing sheet shear failure terminates, that is, where the fiber remains anchored in the laminated sheet. The straight line directions described by the segments of fibers which have parted from the laminated sheet extend across the area of the principal rupture normal to the direction of propagation of the rupture so as to form a plurality of fibers across the rupture. This network of fibers becomes increasingly larger as more fibers part from the laminated sheet and increasingly adds resistance to the propagation of the principal rupture.

Thus it is seen that the material of the invention possesses a tear resistant characteristic that is proportionate to the length of the tear in the material for tears up to several inches in length.

In one embodiment of the invention facing sheets of the following materials may be laminated together by directly heating the films and applying pressure. Such materials include films of polyethylene, polyamides, and polyvinyl alcohols. In addition the following materials have been found to be susceptible to sealing by dielectric heating: plasticized or unplasticized films of polyvinyl chloride.

The facing sheets may in another embodiment of the invention be laminated together by cementing with adhesive rather than by heat sealing. A hard setting adhesive may be used such as those comprised of urethane compositions. Urethane adhesive compositions were found to adhere well to polyester films, polyvinyl chloride films and cellulose triacetate films. Many adhesives were found not to adhere to a polyethylene film with the desired strength. An adhesively cemented laminate containing polyethylene film is generally not preferred.

Polyurethane adhesives may be prepared by reacting a polyester with diisocyanate and a water-bearing activator. Polyesters suitable for reaction with diisocyanate include linear polyesters terminating in hydroxyl groups and having a moderate molecular weight. In order to obtain elastomeric polyurethanes, between 15–40 parts of diisocyanate must be used with 100 parts of polyester.

The reinforcing grid of either the adhesively cemented laminate or the heat sealed laminate may be comprised of natural fibers such as cotton, hemp, jute or wool, or may be comprised of synthetic fibers such as viscose rayon, acetate rayon, polyvinyl chloride, polyethylenes, polystyrenes and polyesters. The fibers comprising the reinforcing grid can also be comprised of ceramic materials such as of glass, or of metals such as of copper, aluminum or steel. The ceramic and metal grid materials are not preferred due to low resistance to repeated sharp bendings and generally are suitable only for special uses of the material.

*Example 1*

A suitable laminate was produced from film webs of thicknesses of 0.5 mil comprised of materials sold under the trademarked name of Koroseal (trademark B. F. Goodrich Company for vinyl chloride film) and Mylar (trademark, E. I. du Pont de Nemours and Company, for polyester film) and having a non-woven grid of Dacron (trademark, E. I. du Pont de Nemours and Co. for strands interposed within the laminated structure. The materials comprising the laminated structure were sealed together by heating the Koroseal sheet electronically with a dielectric heating device. It was found that direct external heating of the polyvinylchloride (Koroseal) material adversely affected the material by darkening and embrittling the sheet before it was suitable softened so as to enable it to adhere to the Mylar sheet.

*Example 2*

A web of polyethylene material sold commercially under the trademarked name Marlex (trademark, Phillips Chemical Company for polyethylene film) was heated to softening and was pressed onto a second web of material of polyester material sold commercially under the trademarked name Mylar with a grid configuration comprised of perpendicularly oriented strands of polyethylene terephthalate synthetic resin fiber sold commercially under the trademarked name Dacron interposed in a non-woven manner therebetween, said strands being superimposed upon each other between the two facing sheets. Pressure was continuously applied to the laminated structure until the polyethylene film had cooled to comfortable handling temperature. The resulting laminate was flexible and transparent and the grid of fibrous material was firmly adhered therein. The resistance of the laminate to tear was superior when rupturing forces were slowly applied. The tear resistance was markedly reduced when the material was subjected to suddenly applied forces.

*Example 3*

A web of polyvinyl chloride material sold commercially as Koroseal was coated with a thin layer of urethane adhesive prepared by reacting polymeric ethyl acrylate and diisocyanate and was pressed onto a second web of material comprised of cellulose triacetate and similarly coated with urethane adhesive with synthetic resin yarn sold commercially as Dacron disposed in a perpendicularly oriented grid between the facing sheets. The resulting laminated structure was kept under slight pressure between rigidly supported foam rubber faces of approximately ¼ inch thickness for 15 minutes. The resulting laminate was firmly adherent, transparent and possessed excellent flexibility and showed no cracking or crazing after repeated sharp bending. The tear characteristics were similar to those in Example 2.

*Example 4*

Two sheets of polyethylene material sold commercially under the trademarked name Marlex, one being 1½ mils in thickness (0.0015 in.) and the other 8 mils in thickness (0.008 inch) were placed together with a perpendicularly oriented grid of Dacron strands located at approximately ¼ inch intervals therebetween. The thinner of the two sheets was heated to softening and pressure applied to the article until the material was cooled sufficiently to be handled with bare hands. The laminated product was well bonded and flexible and showed no set or cracking after repeated folding.

*Example 5*

Two sheets of polyethylene material were used, one having a density of 0.91 and the other having a density of 0.96. Both films were of 3 mils thickness (0.003 in.). A grid of Dacron strands was interposed between the sheets and the article was laminated as in Example 4. The laminated article exhibited excellent resistance to slowly applied rupturing forces; the strands of the grid parted from the laminate by tearing through the lower density polyethylene film to which the heat had been applied and formed into a strong rope of material for several inches after the rupture had progressed past any particular strand before the strand broke.

Example 6

Two sheets of polyethylene were laminated as in Example 4. One sheet was of 0.91 density material of 6 mils thickness and the other of 0.96 density material of 3 mils thickness. The laminated article exhibited an appearance and tear resistance characteristics similar to the materials of Examples 4 and 5.

Example 7

Two polyethylene sheets were combined as in Example 4. One sheet was of 0.96 density material and 4 mils in thickness and the other sheet was of 0.91 density material and 2 mils in thickness. The laminated article exhibited very superior properties of flexibility and tear resistance, and was considered to represent the best laminated product achieved for polyethylene-polyethylene combinations.

Having thus described our invention we claim:

1. A laminated flexible foldable film article comprising a plurality of contiguously adherent polymeric film laminae and comprising the combination of a first outer upper film lamina, a second outer lower film lamina and a plurality of strands of fibrous material disposed between said upper and lower laminae and divided into at least two groups, substantially all of the strands in one group being parallel to one another and extending substantially from one edge of the article to another edge of the article, substantially all of the strands in the second group being parallel to one another and extending at an angle to the strands of the first group and extending substantially from one edge of the article to another edge of the article, all strands in each group being non-interwoven with strands in the other group, all of said strands disposed adjacent a laminar interface of one of said laminae, said upper lamina being dissimilar to said lower lamina and having a lower rupture and bursting strength than said lower lamina, the disposition of said strands at said interface enabling said strands to be torn from said article through said upper lamina by rupture of said upper lamina in the limited areas adjacent the strands without destroying the continuity of the laminated article.

2. The article of claim 1 wherein said first upper film lamina is of thin material and said second lower film lamina is of thick material of the same composition.

3. The article of claim 2 wherein said first upper film lamina is of thin polyethylene and said second lower film lamina is of thick polyethylene.

4. The article of claim 1 wherein said first upper film lamina is of relatively weak polymeric material and said second lower film lamina is of relatively strong polymeric material having substantially the same chemical composition as said first upper film lamina but having a higher density.

5. The article of claim 4 wherein said first upper film lamina is of relatively low density polyethylene and said second lower film lamina is of relatively high density polyethylene.

6. The article of claim 5 wherein said first upper film lamina is of polyethylene having a density of about .091 and said second lower film lamina is of polyethylene having a density of about .096.

7. The article of claim 6 wherein said second lower film lamina is at least twice as thick as said first upper film lamina.

8. The article of claim 1 wherein said laminae are of different chemical compositions.

9. The article of claim 8 wherein one of said laminae is polyethylene terephthlate.

10. The article of claim 8 wherein one of said laminae comprises polyvinyl chloride.

11. The article of claim 8 wherein one of said laminae comprises polyethylene.

12. The article of claim 1 wherein said laminae are adhered together by an interposed lamina of adhesive material.

13. The article of claim 1 wherein said laminae are adhered together directly as by heat sealing.

References Cited by the Examiner

UNITED STATES PATENTS

| | | | |
|---|---|---|---|
| 2,281,635 | 5/42 | Strauss | 161—95 XR |
| 2,650,184 | 8/53 | Biefeld | 156—289 |
| 2,851,389 | 9/58 | Lappala | 154—46 |
| 2,886,481 | 5/59 | Swan | 156—293 |
| 2,983,704 | 5/61 | Roedel | 260—45.5 |
| 3,017,302 | 1/62 | Hultkrans. | |

FOREIGN PATENTS 848,917  9/60  Great Britain.

EARL M. BERGERT, *Primary Examiner.*